US010819478B2

(12) United States Patent
Zhu et al.

(10) Patent No.: US 10,819,478 B2
(45) Date of Patent: Oct. 27, 2020

(54) EXTENDED RANGE MODE TRANSMISSION METHOD AND APPARATUS (71) Applicant: HUAWEI TECHNOLOGIES CO., LTD., Shenzhen, Guangdong (CN)

(72) Inventors: Jun Zhu, Shanghai (CN); Jiayin Zhang, Kanata (CA); Jiyong Pang, Shanghai (CN); Le Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/028,884

(22) Filed: Jul. 6, 2018

(65) Prior Publication Data
US 2018/0316467 A1 Nov. 1, 2018

Related U.S. Application Data (63) Continuation of application No. PCT/CN2016/108602, filed on Dec. 5, 2016.

(30) Foreign Application Priority Data

Jan. 7, 2016 (CN) .......................... 2016 1 0011376

(51) Int. Cl.
*H04W 4/00* (2018.01)
*H04L 5/00* (2006.01)
(Continued)

(52) U.S. Cl.
CPC .......... *H04L 5/0044* (2013.01); *H04L 5/0053* (2013.01); *H04L 27/2602* (2013.01);
(Continued)

(58) Field of Classification Search
CPC . H04L 5/0044; H04L 5/0053; H04L 72/2602; H04L 5/0048; H04W 52/281; H04W 84/12
See application file for complete search history.

(56) References Cited

U.S. PATENT DOCUMENTS 8,175,134 B1 5/2012 Giallorenzi et al.
2011/0194542 A1* 8/2011 Kim ................... H04W 72/0453
370/338
(Continued)

FOREIGN PATENT DOCUMENTS

CN 102792757 A 11/2012
CN 104919889 A 9/2015
(Continued)

OTHER PUBLICATIONS

IEEE 802.11-15/0132r13 IEEE P802.11 Wireless LANs Robert Stacey,"Specification Framework for TGax",Intel,dated Dec. 7, 2015, total 38 pages.
(Continued)

*Primary Examiner* — Abdelnabi O Musa
(74) *Attorney, Agent, or Firm* — Leydig, Voit & Mayer, Ltd.

(57) ABSTRACT

Embodiments of the present invention provide an extended range SU mode PPDU transmission method and apparatus. The method comprises: generating an extended range SU mode PPDU, wherein a legacy preamble part in the extended range SU mode PPDU is transmitted by using a bandwidth of 20 MHz, a data part in the extended range SU mode PPDU is transmitted by using a narrowband, and a bandwidth in the narrowband transmission comprises at least one of the following parameters: a 26-tone RU, a 52-tone RU, a 106-tone RU, or a 242-tone RU; and sending the extended range SU mode PPDU. By applying the method and the apparatus in the embodiments of the present invention, transmission reliability of the data part is improved, performance of parts in the PPDU in an EXT SU mode is more balanced, and a coverage area of long-distance transmission is ensured.

8 Claims, 6 Drawing Sheets (51) Int. Cl.
*H04L 27/26* (2006.01)
*H04W 52/28* (2009.01)
*H04L 25/02* (2006.01)
*H04W 84/12* (2009.01)

(52) U.S. Cl.
CPC ......... *H04W 52/281* (2013.01); *H04L 5/0048* (2013.01); *H04L 25/0204* (2013.01); *H04W 84/12* (2013.01)

(56) References Cited

U.S. PATENT DOCUMENTS

| | | | |
|---|---|---|---|
| 2014/0204891 | A1 | 7/2014 | Park |
| 2016/0094269 | A1 | 3/2016 | Seller et al. |
| 2016/0330714 | A1* | 11/2016 | Hedayat ............ H04W 72/1289 |
| 2017/0093546 | A1* | 3/2017 | Wu ....................... H04L 5/0094 |
| 2017/0094664 | A1* | 3/2017 | Lee ....................... H04L 5/0091 |
| 2017/0150493 | A1* | 5/2017 | Seok .................... H04B 7/0452 |
| 2017/0181136 | A1* | 6/2017 | Bharadwaj ............ H04W 72/12 |
| 2017/0230217 | A1* | 8/2017 | Lim .................... H04L 27/2608 |
| 2018/0115451 | A1 | 4/2018 | Choi et al. |

FOREIGN PATENT DOCUMENTS

| | | |
|---|---|---|
| CN | 105471469 A | 4/2016 |
| RU | 2014105838 A | 9/2015 |
| WO | 2011099729 A2 | 8/2011 |
| WO | 2014110361 A1 | 7/2014 |
| WO | 2014182065 A1 | 11/2014 |
| WO | 2014195794 A2 | 12/2014 |
| WO | 2015061729 A1 | 4/2015 |

OTHER PUBLICATIONS

Robert Stacey Et Al:"IEEE 802.11-15/0132r12 Specification Framework for TGax", TGac Spec Framework, Dec. 1, 2015, XP055398340. 37 pages.
Hongyuan Zhang et al, "802.11ax Preamble Design and Auto-detection-r4",IEEE 802.11-15/0579r4, Sep. 12, 2015, total 46 pages.
Sameer Vermani et al., Extended Range Support for 11ax [online], IEEE 802.11-15/1309r1, Nov. 9, 2015, pp. 1-17.

* cited by examiner

EXTENDED RANGE MODE TRANSMISSION METHOD AND APPARATUS

CROSS-REFERENCE TO RELATED APPLICATIONS

This application is a continuation of International Application No. PCT/CN2016/108602, filed on Dec. 5, 2016, which claims priority to Chinese Patent Application No. 201610011376.1, filed on Jan. 7, 2016. The disclosures of the aforementioned applications are hereby incorporated by reference in their entireties.

TECHNICAL FIELD

The present invention relates to the field of communications technologies, and in particular, to an extended range mode transmission method and apparatus.

BACKGROUND

An existing wireless local area network (English: Wireless local Area Network, WLAN for short) standard based on an orthogonal frequency division multiplexing (English: Orthogonal Frequency Division Multiplexing, OFDM for short) technology includes gradually evolved releases such as 802.11a, 802.11n, and 802.11ac. Currently, the Institute of Electrical and Electronics Engineers (English: Institute of Electrical and Electronics Engineers, IEEE for short) 802.11 standard organization has started standardization work of a new-generation WLAN standard 802.11ax that is referred to as an HEW (High Efficiency WLAN, high-efficiency wireless local area network). By introducing an OFDMA (Orthogonal Frequency Division Multiple Access, orthogonal frequency division multiple access) technology, the 802.11ax may further improve transmission performance of the WLAN in an intensive user scenario.

Figure 1:
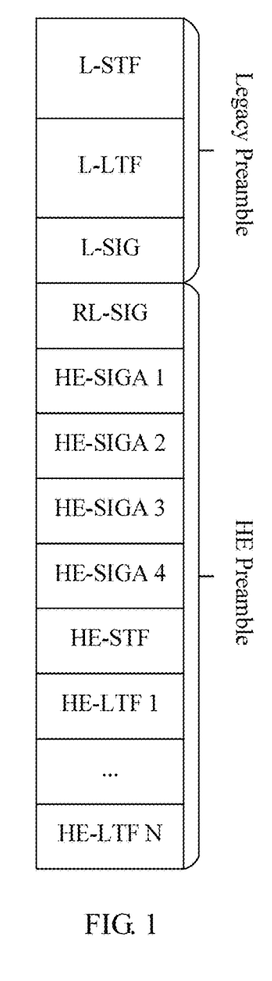
FIG. 1 is a structural diagram of a preamble in an Extended Range SU mode in an existing WLAN standard.

Currently, in the IEEE 11ax draft standard, three types of preamble modes are supported in total. The three types of preamble modes are a single user (SU)/trigger based uplink (Trigger based UL) mode, a multi-user (MU) mode, and an extended range single user (Extended range SU, EXT SU for short) mode. A preamble in the EXT SU mode is shown in FIG. 1. The preamble in the EXT SU mode includes two parts: a legacy preamble and a high-efficiency preamble HE Preamble. To ensure backward compatibility, the legacy preamble part in the preamble in the 802.11ax standard is the same as a legacy preamble part in a preamble in the 802.11n/ac standard. The high-efficiency preamble HE Preamble part includes a repeated legacy signaling RL-SIG field, high-efficiency signaling A fields HE-SIGA fields, a high-efficiency short training field HE-STF, and a high-efficiency long training field HE-LTF.

Both a transmit power of an L-STF field and a transmit power of an L-LTF field in the preamble in the EXT SU mode are increased by 3 dB. The RL-SIG and L-SIG carry same information content. The HE-SIGA in the preamble in the EXT SU mode is in a repetition mode, and includes four OFDM symbols. The HE-SIGA1 and the HE-SIGA2 carry same information content, and the HE-SIGA3 and the HE-SIGA4 carry same information content.

In an EXT SU transmission mode, performance of fields in a preamble is far better than performance of a data part, that is, a coverage area of preamble transmission is relatively large, and a coverage area of data part transmission is far less than the coverage area of the preamble transmission. In this case, during long-distance transmission, a preamble part in a data packet may be correctly received, but it is highly possible that a data part in the data packet cannot be correctly received. Consequently, long-distance transmission of the data packet cannot be actually implemented.

SUMMARY

In view of this, the present invention provides an extended range mode transmission method and apparatus to resolve an existing problem that it is highly possible that a data part in a data packet cannot be correctly received in long-distance transmission of the data packet in a WLAN.

According to a first aspect, an embodiment of the present invention provides an extended range mode transmission method, applied to a wireless local area network WLAN, and the method includes:

generating an extended range mode physical layer protocol data unit PPDU, where a legacy preamble part in the extended range mode PPDU is transmitted by using a bandwidth of 20 MHz, a data part in the extended range mode PPDU is transmitted by using a narrowband, and a bandwidth in the narrowband transmission includes at least one of the following parameters: a 26-tone RU, a 52-tone RU, a 106-tone RU, or a 242-tone RU; and sending the extended range mode PPDU.

According to a second aspect, an embodiment of the present invention provides an extended range mode physical layer protocol data unit PPDU transmission method, applied to a wireless local area network WLAN, and the method includes:

generating an extended range mode physical layer protocol data unit PPDU, where the extended range mode PPDU is transmitted by using a bandwidth of 20 MHz, a data part in the PPDU includes multiple subbands that carry same data, and a bandwidth of the subband includes at least one of the following parameters: a 26-tone RU, a 52-tone RU, a 106-tone RU, or a 242-tone RU; and sending the extended range mode PPDU.

According to a third aspect, an embodiment of the present invention provides an extended range mode physical layer protocol data unit PPDU transmission apparatus, applied to a wireless local area network WLAN, and the apparatus includes:

a baseband circuit, configured to generate an extended range mode physical layer protocol data unit PPDU, where a legacy preamble part in the extended range mode PPDU is transmitted by using a bandwidth of 20 MHz, a data part in the extended range mode PPDU is transmitted by using a narrowband, and a bandwidth in the narrowband transmission includes at least one of the following parameters: a 26-tone RU, a 52-tone RU, a 106-tone RU, or a 242-tone RU; and a radio frequency circuit, configured to send the extended range mode PPDU.

According to a fourth aspect, an embodiment of the present invention provides an extended range mode physical layer protocol data unit PPDU transmission apparatus, applied to a wireless local area network WLAN, and the apparatus includes:

a baseband circuit, configured to generate an extended range mode physical layer protocol data unit PPDU, where the extended range mode PPDU is transmitted by using a bandwidth of 20 MHz, a data part in the PPDU includes multiple subbands that carry same data, and a bandwidth of the subband includes at least one of the following parameters: a 26-tone RU, a 52-tone RU, a 106-tone RU, or a 242-tone RU; and a radio frequency circuit, configured to send the extended range mode PPDU.

Embodiments of the present invention provide the new extended range mode physical layer protocol data unit PPDU. The legacy preamble part in the extended range mode PPDU is transmitted by using the bandwidth of 20 MHz. The data part in the extended range mode PPDU is transmitted by using the narrowband, and the bandwidth in the narrowband transmission includes at least one of the following parameters: the 26-tone RU, the 52-tone RU, the 106-tone RU, or the 242-tone RU. The data part in the extended range mode PPDU is transmitted by using the narrowband, so that transmission reliability of the data part is improved, performance of parts in the PPDU in an EXT SU mode is more balanced, and a converge area of long-distance transmission is ensured.

DESCRIPTION OF EMBODIMENTS

The following further describes specific embodiments of the present invention in detail with reference to accompanying drawings.

Embodiments of the present invention may be applied to a WLAN. Currently, a standard used by the WLAN is an IEEE802.11 series. The WLAN may include multiple basic service sets (English: Basic Service Set, BSS for short). A network node in a basic service set is a station (English: Station, STA for short). The station includes an access point (AP for short, English: Access Point) and a non-access point station (English: Non Access Point Station, Non-AP STA for short). Each basic service set may include one AP and multiple non-AP STAs associated with the AP.

The access point is also referred to as a wireless access point, a hotspot, or the like. The AP is mainly deployed in home or within a building and a park. A typical coverage radius of the AP is tens to hundreds of meters. The AP is equivalent to a bridge that connects a wired network and a wireless network. A main function of the AP is to connect wireless network clients together and then connect the wireless network to the Ethernet. Specifically, the AP may be a terminal device or a network device that has a WiFi (English: Wireless Fidelity, Chinese: Wireless Fidelity) chip. The AP may support multiple standards such as 802.11ax, 802.11ac, 802.11n, 802.11g, 802.11b, and 802.11a.

The non-access point station (English: Non Access Point Station, Non-AP STA for short) may be a wireless communications chip, a wireless sensor, or a wireless communications terminal. Specifically, for example, the non-access point station may be a smartphone, a tablet computer, or a personal computer that supports a WiFi communication function, a set top box or a smart TV that supports a WiFi communication function, a smart wearable device that supports a WiFi communication function, an in-vehicle communications device that supports a WiFi communication function, or a drone that supports a WiFi communication function. The station may support multiple standards such as 802.11ax, 802.11ac, 802.11n, 802.11g, 802.11b, and 802.11a. It should be noted that the non-AP STA is referred to as STA for short below.

Figure 2:
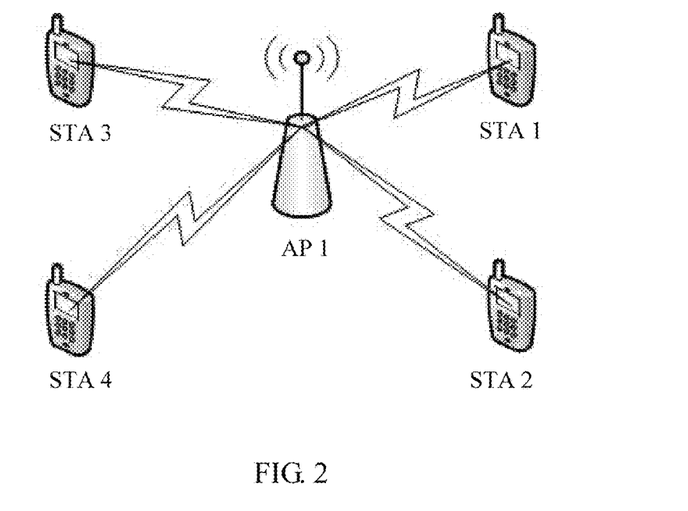
FIG. 2 is a diagram of an application scenario according to the present invention.

FIG. 2 is a schematic system diagram of a typical WLAN deployment scenario, including one AP and four STAs. The AP communicates with the STA 1 to the STA 4. For the 802.11 family, a work group TGax introduces an OFDMA (English: Orthogonal Frequency Division Multiple Access, Chinese: orthogonal frequency division multiple access) technology and an uplink MU-MIMO (English: multi-user multiple-input multiple-output, Chinese: multi-user multiple-input multiple-output) technology into a next-generation WLAN standard. By using the foregoing technologies, data transmission can be performed between the STA 1 to the STA 4 and the AP on different frequency resources at a same time or on different spatial flows at a same time.

Embodiment 1

Figure 3:
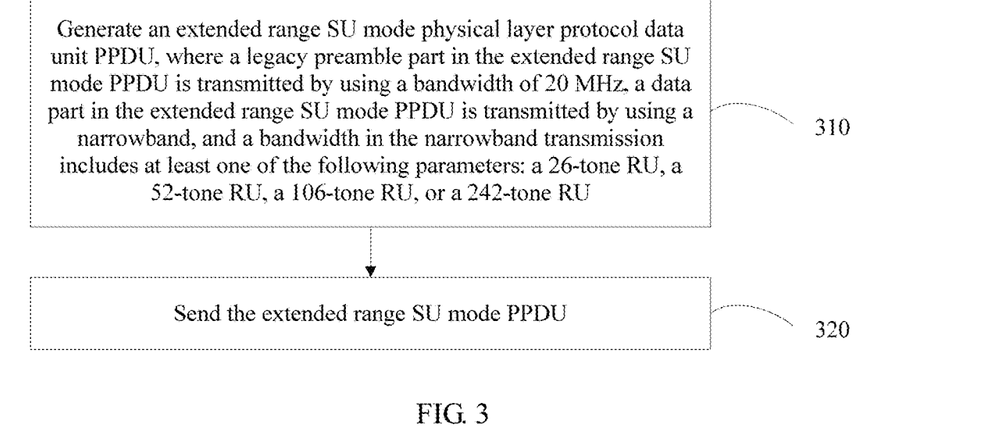
FIG. 3 is a flowchart of a transmission method according to Embodiment 1 of the present invention.

Embodiment 1 of the present invention provides an extended range mode transmission method. The method may be applied to an access point and a station, such as the AP and the STA 1 to the STA 4 in FIG. 2. The access point and the station may support a next-generation WLAN standard, such as the 802.11ax standard. FIG. 3 is a flowchart of the transmission method, and specific steps are as follows:

Step 310: Generate an extended range mode physical layer protocol data unit PPDU, where a legacy preamble part in the extended range mode PPDU is transmitted by using a bandwidth of 20 MHz, a data part in the extended range mode PPDU is transmitted by using a narrowband, and a bandwidth in the narrowband transmission includes at least one of the following parameters: a 26-tone RU, a 52-tone RU, a 106-tone RU, or a 242-tone RU.

Step 320: Send the extended range mode PPDU.

In the foregoing method, the data part in the PPDU is transmitted by using the narrowband. This increases power spectrum density of the data part, and improves transmission reliability of the data part, so that performance of parts in the PPDU in an EXT SU mode is more balanced, and a converge area of long-distance transmission is ensured.

Figure 4:
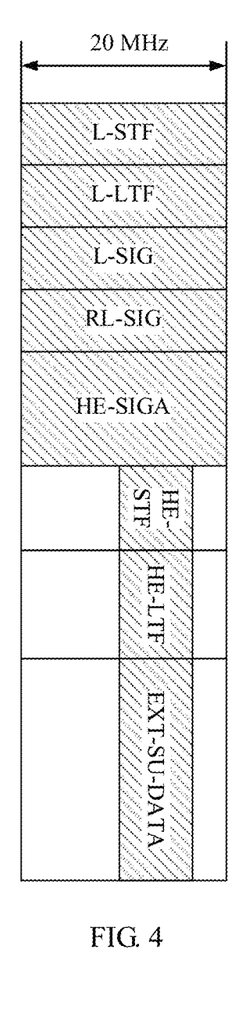
FIG. 4 is a structural diagram of a preamble in an Extended Range SU mode according to Embodiment 1 of the present invention.
Figure 6:
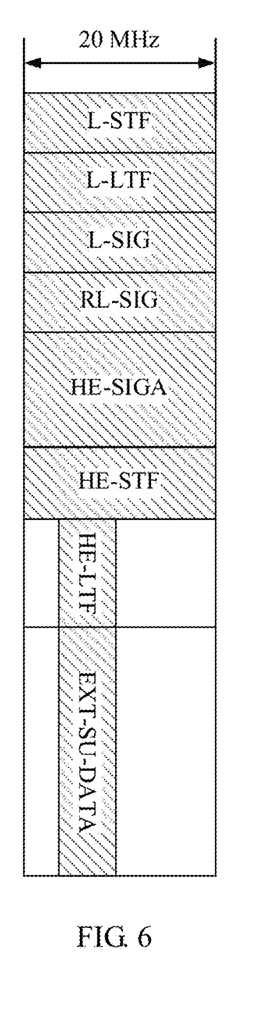
FIG. 6 is another structural diagram of a preamble in an Extended Range SU mode according to Embodiment 1 of the present invention.

Specifically, a structural diagram of the extended range SU mode PPDU is shown in FIG. 4. Subcarriers used by a high-efficiency short training field HE-STF and subcarriers used by a high-efficiency long training field HE-LTF in the extended range mode PPDU are the same as subcarriers used by the data part in the extended range mode PPDU. Specifically, fields starting from an L-STF field to an HE-SIGA field are transmitted by using the bandwidth of 20 MHz. The HE-STF field, the HE-LTF field, and an EXT-SU-DATA field are transmitted by using the narrowband, and a same narrowband bandwidth is used. Optionally, as shown in FIG. 6, fields in the PPDU that are transmitted by using the narrowband may start from the HE-LTF part, that is, the HE-STF and the parts before the HE-STF are all transmitted by using the bandwidth of 20 MHz.

Figure 7:
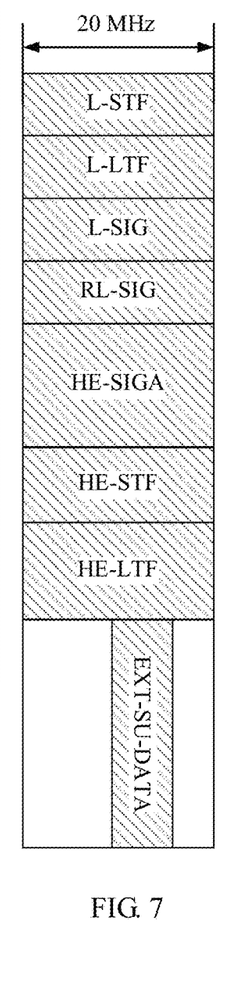
FIG. 7 is another structural diagram of a preamble in an Extended Range SU mode according to Embodiment 1 of the present invention.

Optionally, as shown in FIG. 7, fields in the PPDU that are transmitted by using the narrowband may start from the EXT-SU-data part, that is, the HE-STF, the HE-LTF, and the parts before the HE-STF are all transmitted by using the bandwidth of 20 MHz.

Figure 5:
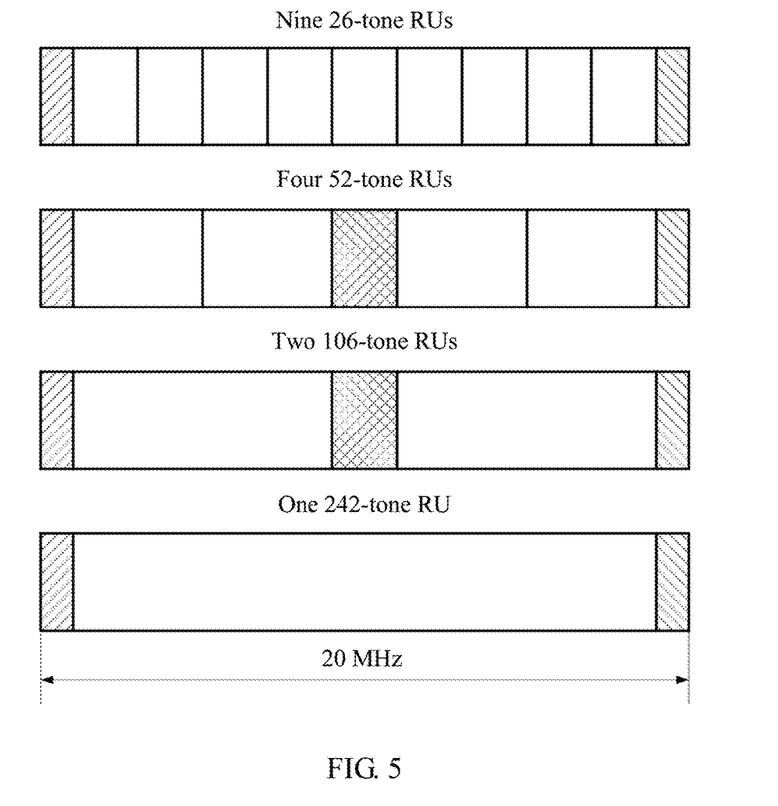
FIG. 5 is a diagram of RU allocation in a bandwidth of 20 MHz according to the present invention.

It should be noted that, the narrowband transmission mentioned in step 310 is transmission that is performed on a bandwidth of less than or equal to 20 MHz. RU mentioned in step 310 is a resource unit. A data part in an HE-PPDU defined by the TGax is modulated by 256-point FFT. Therefore, the bandwidth of 20 MHz includes 256 subcarriers. Distribution of the subcarriers in the bandwidth of 20 MHz is shown in FIG. 5. In the bandwidth of 20 MHz, an RU allocation manner such as nine 26-tone RUs, four 52-tone RUs, two 106-tone RUs, or one 242-tone RU is included.

In addition, to further improve the transmission reliability of the data part in the EXT SU mode, a transmit power of the HE-LTF field in the preamble in an EXT SU mode may be increased. Specifically, the following manners are included.

Manner 1: The power of the high-efficiency long training field HE-LTF in the extended range mode PPDU is increased by 3 dB. In Manner 1, in a process in which the station generates the PPDU, the power of the HE-LTF field is increased by default, and a value of power increase may be 3 dB or another value.

Manner 2: The high-efficiency signaling HE-SIGA field in the extended range mode PPDU includes a first identifier, and the first identifier is used to indicate whether the power of the high-efficiency long training field HE-LTF is increased. In Manner 2, the first identifier may be indicated by one or more bits. For example, the first identifier in the HE-SIGA carries one bit to indicate whether the power of the HE-LTF is increased. For example, 0 indicates that the power is not increased, and 1 indicates that the power of the HE-LTF is increased. In addition, the first identifier in the HE-SIGA carries multiple bits, and the first identifier can not only indicate whether the power of the HE-LTF is increased, but also indicate a value of power increase. For ease of implementation, the power of the HE-LTF is uniformly increased by 3 dB.

Optionally, in actual implementation, a value of power increase of the HE-LTF field may be bound to a size of an LTF and a transmission bandwidth. For example, when a transmission bandwidth of the HE-LTF and the data part is 52-tone RU, a power of a 2×LTF is increased by 4 dB. For another example, when a transmission bandwidth of the HE-LTF and the data part is 106-tone RU, a power of a 4×LTF is increased by 3 dB.

Optionally, a transmit power of the HE-STF part may be increased separately.

In the foregoing method, the transmit power of the HE-LTF is increased, so that accuracy of channel estimation can be improved. Therefore, a bit error rate of demodulating and decoding the data part is reduced, and the transmission reliability of the data part is improved.

Specifically, the high-efficiency signaling HE-SIGA field in the extended range mode PPDU includes a second identifier. The second identifier is used to indicate a bandwidth used when the narrowband transmission is performed on the data part in the extended range mode PPDU. It can be learned from FIG. 5 that, in the bandwidth of 20 MHz, an RU allocation manner such as nine 26-tone RUs, four 52-tone RUs, two 106-tone RUs, or one 242-tone RU is included. A specific distribution manner of subcarriers in an RU is shown in Table 0.

TABLE 0

| RU type | Distribution range of subcarriers in an RU | | | | |
|---|---|---|---|---|---|
| 26-subcarrier | RU 1 | RU 2 | RU 3 | RU 4 | RU 5 |
| | [−121:−96] | [−95:−70] | [−68:−43] | [−42:−17] | [−16:−4, 4:16] |
| | RU 6 | RU 7 | RU 8 | RU 9 | — |
| | [17:42] | [43:68] | [70:95] | [96:121] | |
| 52-subcarrier | RU 1 | RU 2 | RU 3 | RU 4 | — |
| | [−121:−70] | [−68:−17] | [17:68] | [70:121] | |
| 106-subcarrier | RU 1 | | RU 2 | | — |
| | [−122:−17] | | [17:122] | | |
| 242-subcarrier | RU 1 | | | | |
| | [−122:−2, 2:122] | | | | |

Therefore, a mapping relationship between the second identifier and RU allocation includes the following manners.

Manner 1: The second identifier includes 4 bits, that is, 4-bit resource allocation (Resource Allocation) indication signaling is carried in the HE-SIGA field in the preamble in an EXT SU mode. A specific indication manner may be shown in Table 1. For example, 0000 indicates that a leftmost 26-tone RU 1 is allocated as a bandwidth for fields starting from the HE-STF part in this transmission, 0100 indicates that a middle 26-tone RU 5 is allocated as the bandwidth for the fields starting from the HE-STF part in this transmission, and 1000 indicates that a rightmost 26-tone RU 9 is allocated as the bandwidth for the fields starting from the HE-STF part in this transmission. For another example, 1001 indicates that a leftmost 52-tone RU 1 is allocated as a bandwidth for fields starting from the HE-STF part in this transmission, 1010 indicates that a second 52-tone RU 2 counting from the left is allocated as a bandwidth for fields starting from the HE-STF part in this transmission, and 1000 indicates that a rightmost 52-tone RU 4 is allocated as the bandwidth for the fields starting from the HE-STF part in this transmission. For a further example, 1101 indicates that a left 106-tone RU 1 is allocated as a bandwidth for fields starting from the HE-STF part in this transmission, and 1110 indicates that a right 106-tone RU 2 is allocated as the bandwidth for the fields starting from the HE-STF part in this transmission.

TABLE 1

| Bits | Description |
|---|---|
| 0000-1000 | Indicating the 26-tone RUs to be allocated |
| 1001-1100 | Indicating the 52-tone RUs to be allocated |
| 1101-1110 | Indicating the 106-tone RUs to be allocated |
| 1111 | Indicating the 242-tone RU to be allocated |

Optionally, if it is stipulated that the 242-tone RU is not used as a transmission bandwidth for fields starting from the HE-STF part, the 1111 signaling bit may be used as a reserved (Reserved) bit.

Optionally, signaling and content indicated by the signaling in Table 1 may be arranged in another order. For example, 1111 to 0111 indicate the 26-tone RUs to be allocated, 0110 to 0011 indicate the 52-tone RUs to be allocated, 0010 to 0001 indicate the 106-tone RUs to be allocated, and 0000 indicates the 242-tone RU to be allocated.

Manner 2: The second identifier includes 3 bits, that is, 3-bit resource allocation (Resource Allocation) indication signaling is carried in the HE-SIGA field in the preamble in an EXT SU mode. A specific indication manner may be shown in Table 2. For example, 000 indicates that a leftmost 52-tone RU 1 is allocated as a bandwidth for fields starting from the HE-STF part in this transmission, and 011 indicates that a rightmost 52-tone RU 4 is allocated as the bandwidth for the fields starting from the HE-STF part in this transmission. For another example, 100 indicates that a left 106-tone RU 1 is allocated as a bandwidth for fields starting from the HE-STF part in this transmission, and 101 indicates that a right 106-tone RU 2 is allocated as the bandwidth for the fields starting from the HE-STF part in this transmission. 111 indicates a reserved bit.

TABLE 2

| Bits | Description |
|---|---|
| 000-011 | Indicating the 52-tone RUs to be allocated |
| 100-101 | Indicating the 106-tone RUs to be allocated |
| 110 | Indicating the 242-tone RU to be allocated |
| 111 | Reserved |

Optionally, if it is stipulated that the 242-tone RU is not used as a transmission bandwidth for fields starting from the HE-STF part, the 110 signaling bit may also be used as a reserved (Reserved) bit.

Optionally, signaling and content indicated by the signaling in Table 2 may be arranged in another order.

Manner 3: The second identifier includes 2 bits, that is, 2-bit resource allocation (Resource Allocation) indication signaling is carried in the HE-SIGA field in the preamble in an EXT SU mode. A specific indication manner may be shown in Table 3. For example, 00 indicates that a left 106-tone RU 1 is allocated as a bandwidth for fields starting from the HE-STF part in this transmission, 01 indicates that a right 106-tone RU 2 is allocated as the bandwidth for the fields starting from the HE-STF part in this transmission, 10 indicates that the 242-tone RU 1 is allocated as the bandwidth for the fields starting from the HE-STF part in this transmission, and 11 indicates a reserved bit.

TABLE 3

| Bits | Description |
|---|---|
| 00-01 | Indicating the 106-tone RUs to be allocated |
| 10 | Indicating the 242-tone RU to be allocated |
| 11 | Reserved |

Optionally, if it is stipulated that the 242-tone RU is not used as a transmission bandwidth for fields starting from the HE-STF part, only 1-bit RA indication signaling is needed. In this case, 0 indicates that a left 106-tone RU 1 is allocated as a bandwidth for fields starting from the HE-STF part in this transmission, and 1 indicates that a right 106-tone RU 2 is allocated as the bandwidth for the fields starting from the HE-STF part in this transmission.

Optionally, signaling and content indicated by the signaling in Table 3 may be arranged in another order.

Manner 4: Only some pre-selected RUs are used for transmitting parts starting from the HE-STF in the EXT SU PPDU. In this example, newly-defined subcarrier distribution is shown in FIG. 4. Each RU has a unique size, and middle subcarriers that are close to a direct current are used. It should be understood that, Table 4 is merely an example, and another newly-defined subcarrier distribution table may be used. For example, subcarriers included in a 26-tone RU are [−14:−2, 2:14], subcarriers included in a 52-tone RU are [−27:−2, 2:27], and subcarriers included in a 106-tone RU are [−56:−2, 2:56].

TABLE 4

| RU type | Distribution range of subcarriers in an RU |
|---|---|
| 26-subcarrier | RU [−16:−4, 4:16] |
| 52-subcarrier | RU [−29:−4, 4:29] |
| 106-subcarrier | RU [−56:−4, 4:56] |
| 242-subcarrier | RU [−122:−2, 2:122] |

In this case, there are four types of scheduling selections in total. Therefore, 2-bit resource allocation (Resource Allocation) indication signaling needs to be carried in the HE-SIGA field in the preamble in an EXT SU mode. A specific indication manner may be shown in Table 5. For example, 00 indicates that the 26-tone RU is allocated as a bandwidth for fields starting from the HE-STF part in this transmission, 01 indicates that the 52-tone RU is allocated as the bandwidth for the fields starting from the HE-STF part in this transmission, 10 indicates that the 106-tone RU is allocated as the bandwidth for the fields starting from the HE-STF part in this transmission, and 11 indicates that the 242-tone RU is allocated as the bandwidth for the fields starting from the HE-STF part in this transmission.

TABLE 5

| Bits | Description |
|---|---|
| 00 | Indicating the 26-tone RU to be allocated |
| 01 | Indicating the 52-tone RU to be allocated |
| 10 | Indicating the 106-tone RU to be allocated |
| 11 | Indicating the 242-tone RU to be allocated |

Optionally, if it is stipulated that the 242-tone RU is not used as a transmission bandwidth for fields starting from the HE-STF part, 11 may be used as a reserved bit.

It should be understood that the transmission bandwidth for the fields starting from the HE-STF part may be further limited to the 52-tone RU, the 106-tone RU, or the 242-tone RU, where the 52-tone RU, the 106-tone RU, and the 242-tone RU are defined in Table 4. In this case, for the 2-bit RA indication signaling, 00 may be used to indicate the 52-tone RU, 01 may be used to indicate the 106-tone RU, 10 may be used to indicate the 242-tone RU, and 11 may be used as a reserved bit. If it is stipulated that the 242-tone RU is not used as the transmission bandwidth for the fields starting from the HE-STF part, 1-bit RA indication signaling is used. In this case, 0 indicates that the 52-tone RU is allocated as the bandwidth for the fields starting from the HE-STF part in this transmission, and 1 indicates that the 106-tone RU is allocated as the bandwidth for the fields starting from the HE-STF part in this transmission.

It should be understood that the transmission bandwidth for the fields starting from the HE-STF part may be further limited to the 106-tone RU or the 242-tone RU, where the 106-tone RU and the 242-tone RU are defined in Table 4. In this case, only 1-bit RA indication signaling is used, that is, 0 indicates that the 106-tone RU is allocated as the bandwidth for the fields starting from the HE-STF part in this transmission, and 1 indicates that the 242-tone RU is allocated as the bandwidth for the fields starting from the HE-STF part in this transmission.

Optionally, the foregoing signaling and content indicated by the foregoing signaling may be arranged in another order. For example, 0 indicates that the 106-tone RU is allocated as the bandwidth for the fields starting from the HE-STF part in this transmission, and 1 indicates that the 52-tone RU is allocated as the bandwidth for the fields starting from the HE-STF part in this transmission. For another example, 0 indicates that the 242-tone RU is allocated as the bandwidth for the fields starting from the HE-STF part in this transmission, and 1 indicates that the 106-tone RU is allocated as the bandwidth for the fields starting from the HE-STF part in this transmission.

Manner 5: An RU is pre-selected according to a principle of a minimum PAPR of the HE-LTF field, and the pre-selected RU is used to transmit parts starting from the HE-STF in the EXT SU PPDU. Table 6 shows PAPR distribution of the HE-LTF field. A first number in each grid represents a PAPR value of an RU corresponding to a 4×LTF, and a second number represents a PAPR value of an RU corresponding to a 2×LTF.

TABLE 6

| 3.51 | 3.56 | 3.56 | 3.51 | 3.78 | 3.51 | 3.56 | 3.56 | 3.51 |
|---|---|---|---|---|---|---|---|---|
| 3.89 | 3.27 | 3.58 | 4.22 | 4.10 | 3.89 | 3.27 | 3.58 | 4.22 |
| 4.40, 3.92 | | 4.85, 3.78 | | | 4.85, 3.92 | | 4.40, 3.78 | |
| | 4.78, 4.51 | | | | | 4.93, 4.53 | | |
| | | | | 4.83, 4.87 | | | | |

In this example, six types of scheduling selections with relatively small PAPRs are selected in total, that is, parts with a gray background in Table 6. Therefore, 3-bit resource allocation (Resource Allocation) indication signaling needs to be carried in the HE-SIGA field in the preamble in an EXT SU mode. A specific indication manner may be shown in Table 7. For example, 000 indicates that a left 26-tone RU with a gray background is allocated as a bandwidth for fields starting from the HE-STF part in this transmission, 001 indicates that a right 26-tone RU with a gray background is allocated as the bandwidth for the fields starting from the HE-STF part in this transmission, 100 indicates that a 106-tone RU with a gray background is allocated as the bandwidth for the fields starting from the HE-STF part in this transmission, and 101 indicates that the 242-tone RU with a gray background is allocated as the bandwidth for the fields starting from the HE-STF part in this transmission.

TABLE 7

| Bits | Description |
|---|---|
| 000-001 | Indicating the 26-tone RUs to be allocated |
| 010-011 | Indicating 52-tone RUs to be allocated |
| 100 | Indicating the 106-tone RU to be allocated |
| 101 | Indicating the 242-tone RU to be allocated |
| 110-111 | Reserved |

Optionally, if it is stipulated that the 242-tone RU is not used as a transmission bandwidth for fields starting from the HE-STF part, 101 may also be used as a reserved bit.

Optionally, if only 52-tone RUs, a 106-tone RU, and the 242-tone RU are used, for 2-bit RA indication signaling, 00 may be used to indicate a left 52-tone RU with a gray background, 01 may be used to indicate a right 52-tone RU with a gray background, 10 may be used to indicate the 106-tone RU with a gray background, and 11 may be used to indicate the 242-tone RU. If it is stipulated that the 242-tone RU is not used as a transmission bandwidth for fields starting from the HE-STF part, 11 is used as a reserved bit.

Optionally, if only a 106-tone RU and the 242-tone RU are used, only 1-bit RA indication signaling is needed. In this case, 0 indicates that the 106-tone RU is allocated as a bandwidth for fields starting from the HE-STF part in this transmission, and 1 indicates that the 242-tone RU is allocated as the bandwidth for the fields starting from the HE-STF part in this transmission.

Optionally, the foregoing signaling and content indicated by the foregoing signaling may be arranged in another order.

It should be understood that RUs selected according to the foregoing principle may be in another set, for example, only the left 26-tone RU with a gray background, the right 52-tone RU with a gray background, the left 106-tone RU with a gray background, and the 242-tone RU are selected. In this case, only 2-bit RA indication signaling is needed, 00 may be used to indicate the left 26-tone RU with a gray background, 01 may be used to indicate the right 52-tone RU with a gray background, 10 may be used to indicate the left 106-tone RU with a gray background, and 11 may be used to indicate the 242-tone RU. If it is stipulated that the 242-tone RU is not used as the transmission bandwidth for the fields starting from the HE-STF part, 11 is used as a reserved bit. Optionally, if only the 52-tone RU, the 106-tone RU, and the 242-tone RU are used, for 2-bit RA indication signaling, 00 may be used to indicate the right 52-tone RU with a gray background, 01 may be used to indicate the left 106-tone RU with a gray background, 10 may be used to indicate the 242-tone RU, and 11 is a reserved bit. If it is stipulated that the 242-tone RU is not used as the transmission bandwidth for the fields starting from the HE-STF part, only 1-bit RA indication signaling is needed, 0 indicates the right 52-tone RU with a gray background, and 1 indicates the left 106-tone RU with a gray background.

Manner 6: The pre-selected RU may be selected according to another principle, for example, according to a principle of a minimum PAPR of the HE-STF field. Alternatively, the pre-selected RU may be selected according to a principle of preventing out-of-band leakage, the 26-tone RU 1, the 26-tone RU 9, the 52-tone RU 1, and the 52-tone RU 4 that are located on two sides of Table 0 may be eliminated, and remaining RUs are selected as optional RUs.

An RU set is selected according to whichever principle. It is assumed that the set includes N available RUs. The N RUs in the set are sorted according to a quantity of subcarriers included in the RU and a location at which the RU is located, for example, the N RUs in the set are sorted in ascending order in terms of the quantity of subcarriers included in the RU and sorted from the left to the right in terms of the location at which the RU is located. Then, k=⌈log$_2$ N⌉-bit signaling is used to sequentially indicate the N available RUs, and excessive $2^k$–N combinations may be used as reserved bits. Herein, ⌈ ⌉ represents rounding up. It should be understood that the N available RUs may be sorted according to another rule. This is not limited in the present invention.

Optionally, the second identifier may not only indicate the bandwidth used when the data part is transmitted by using the narrowband, but also indicate a modulation and coding scheme MCS used by the data part. For example, an MCS field in the HE-SIGA field in the preamble in an EXT SU mode includes 4-bit indication information, where 0000 to 1010 are used to indicate 10 MCSs from MCS 0 to MCS 9, and 1011 to 1111 indicate a combination of reserved bits. In the HE-SIGA field in the preamble in the EXT SU mode, the 4-bit indication information may be re-defined. For example, 0000 indicates that a 26-tone RU is used and the MCS 0 is used for modulation and coding; 0001 indicates that a 52-tone RU is used and the MCS 0 is used for modulation and coding; 0010 indicates that a 106-tone RU is used and the MCS 0 is used for modulation and coding; 0011 indicates that the 242-tone RU is used and the MCS 0 is used for modulation and coding; 0100 indicates that a 26-tone RU is used and the MCS 1 is used for modulation and coding; 0101 indicates that a 52-tone RU is used and the MCS 1 is used for modulation and coding; 0110 indicates that a 106-tone RU is used and the MCS 1 is used for modulation and coding; 0111 indicates that the 242-tone RU is used and the MCS 1 is used for modulation and coding; and 1000 to 1111 indicate a combination of reserved bits. Optionally, some bits in the 4-bit indication information are used to indicate an MCS, and some bits are used to indicate RU allocation. For example, one bit indicates MCS information, two bits indicate an RU allocation manner, and one bit is reserved.

Optionally, the second identifier may further indicate the bandwidth used when the data part is transmitted by using the narrowband and a quantity of spatial flows used by the data part. For example, an NSTS field in the HE-SIGA field in the preamble in an EXT SU mode includes 3-bit indication information, where 000 to 111 are used to indicate eight space-time streams. In the extended range SU mode, a quantity of space-time streams used by the PPDU is less than 8. Therefore, the 3-bit indication information may be re-defined. Some bits are used to indicate an NSTS, and some bits are used to indicate RU allocation. For example, one bit indicates an NSTS, and two bits indicate an RU allocation manner.

It should be understood that, if a transmission bandwidth is larger, energy per bandwidth is lower, and a coverage area is smaller. Preferably, to implement a relatively large converge area, the maximum transmission bandwidth of the EXT SU PPDU may be limited to 20 MHz, that is, BW indication signaling carried in the HE-SIGA field in the preamble in the EXT SU mode is set to 00 by default.

Optionally, a value of the transmission bandwidth may be greater than 20 MHz. In this case, a fifth identifier included in the high-efficiency signaling HE-SIGA field in the extended range mode PPDU may be generated according to subcarrier distribution in a bandwidth of 40 MHz/80 MHz/160 MHz/80+80 MHz and the method in the foregoing embodiment. The fifth identifier is used to indicate a bandwidth used when the narrowband transmission is performed on the data part in the extended range mode PPDU.

Optionally, a value of the transmission bandwidth may be greater than 20 MHz. In this case, a sixth identifier included in the high-efficiency signaling HE-SIGA field in the extended range mode PPDU may be generated according to subcarrier distribution in a bandwidth of 40 MHz/80 MHz/160 MHz/80+80 MHz and the method in the foregoing embodiment. The sixth identifier is used to indicate a bandwidth used when repeated subband transmission is performed on the data part in the extended range mode PPDU.

Optionally, a seventh identifier is included in the high-efficiency signaling HE-SIGA field in the extended range mode PPDU. The seventh identifier is used to indicate ID information of a receive end, for example, an AID (Association ID) of the receive end; partial AID; a STA ID; partial STA ID, such as the last six bits or the first four bits of the STA ID; or any other ID information related to the receive end. The receive end may determine, by using the seventh identifier, whether a destination of this transmission is the receive end. If the seventh identifier indicates that the destination of this transmission is not the receive end, receiving may be stopped, and power consumption of the device is reduced.

This embodiment of the present invention provides the new extended range mode physical layer protocol data unit PPDU. The legacy preamble part in the extended range mode PPDU is transmitted by using the bandwidth of 20 MHz. The data part in the extended range mode PPDU is transmitted by using the narrowband, and the bandwidth in the narrowband transmission includes at least one of the following parameters: the 26-tone RU, the 52-tone RU, the 106-tone RU, or the 242-tone RU. The data part in the extended range mode PPDU is transmitted by using the narrowband, so that the transmission reliability of the data part is improved, the performance of the parts in the PPDU in the EXT SU mode is more balanced, and the converge area of long-distance transmission is ensured.

Embodiment 2

Figure 8:
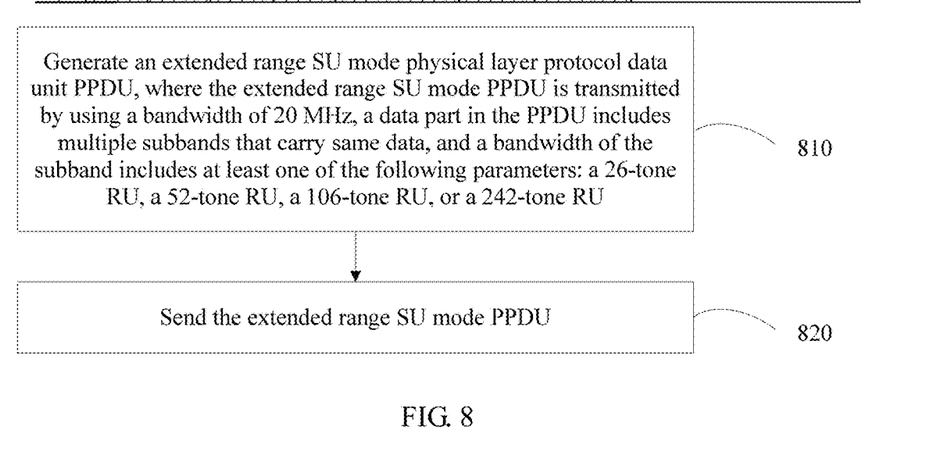
FIG. 8 is a flowchart of a transmission method according to Embodiment 2 of the present invention.

Embodiment 2 of the present invention provides an extended range mode transmission method. The method may be applied to an access point and a station, such as the AP and the STA 1 to the STA 4 in FIG. 2. The access point and the station may support a next-generation WLAN standard, such as the 802.11ax standard. FIG. 8 is a flowchart of the transmission method, and specific steps are as follows.

Step 810: Generate an extended range mode physical layer protocol data unit PPDU, where the extended range SU mode PPDU is transmitted by using a bandwidth of 20 MHz, a data part in the PPDU includes multiple subbands that carry same data, and a bandwidth of the subband includes at least one of the following parameters: a 26-tone RU, a 52-tone RU, a 106-tone RU, or a 242-tone RU.

Step 820: Send the extended range SU mode PPDU.

In the foregoing method, the data part in the PPDU is transmitted repeatedly. This improves transmission reliability of the data part, so that performance of parts in the PPDU in an EXT SU mode is more balanced, and a converge area of long-distance transmission is ensured.

Figure 9:
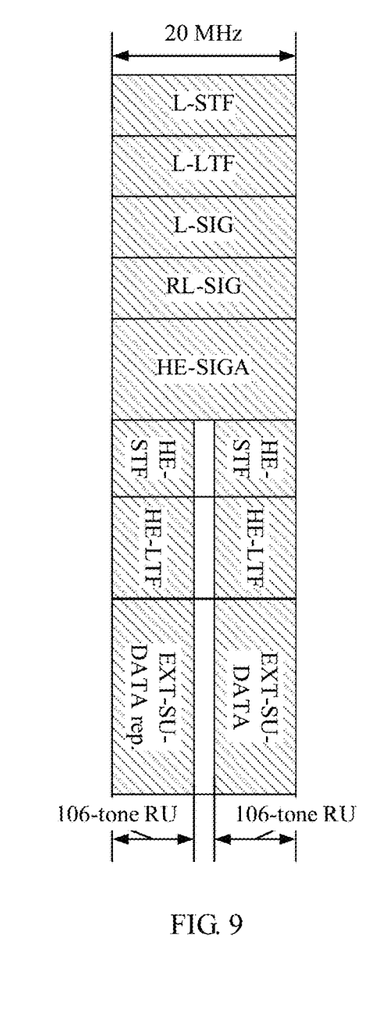
FIG. 9 is a structural diagram of a preamble in an Extended Range SU mode according to Embodiment 2 of the present invention.
Figure 10:
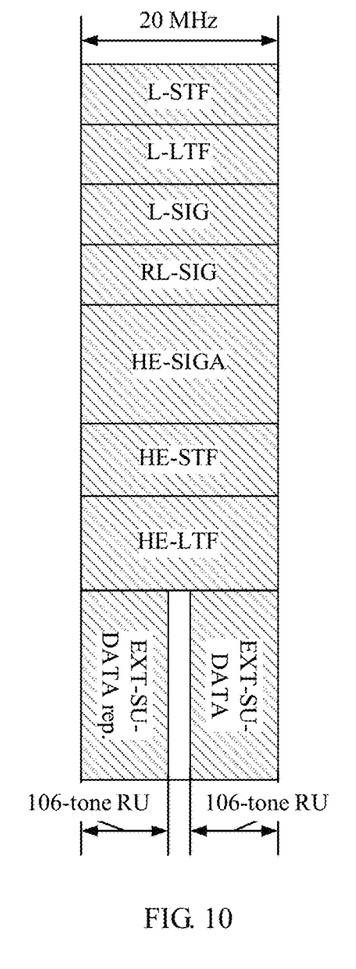
FIG. 10 is another structural diagram of a preamble in an Extended Range SU mode according to Embodiment 2 of the present invention.

Specifically, a structural diagram of the extended range mode PPDU is shown in FIG. 9. Subcarriers used by a high-efficiency short training field HE-STF and subcarriers used by a high-efficiency long training field HE-LTF in the extended range mode PPDU are the same as subcarriers used by the data part in the extended range mode PPDU. Optionally, an HE-STF field may be transmitted by using the bandwidth of 20 MHz, and only subcarriers used by an HE-LTF part are the same as subcarriers used by the data part in the extended range mode PPDU. Optionally, as shown in FIG. 10, an HE-STF and an HE-LTF may be transmitted by using the bandwidth of 20 MHz, and repeated subband transmission is performed only on the EXT-SU-DATA part.

To further improve the transmission reliability of the data part in the EXT SU mode, a transmit power of the HE-LTF field in a preamble in an EXT SU mode may be increased. Specifically, the following manners are included.

Manner 1: The power of the high-efficiency long training field HE-LTF in the extended range SU mode PPDU is increased by 3 dB. In Manner 1, in a process in which the station generates the PPDU, the power of the HE-LTF field is increased by default, and a value of power increase may be 3 dB or another value.

Manner 2: A high-efficiency signaling HE-SIGA field in the extended range mode PPDU includes a third identifier, and the third identifier is used to indicate whether the power of the high-efficiency long training field HE-LTF is increased. In Manner 2, the third identifier may be indicated by one or more bits. For example, the third identifier in the HE-SIGA carries one bit to indicate whether the power of the HE-LTF is increased. For example, 0 indicates that the power is not increased, and 1 indicates that the power of the HE-LTF is increased. In addition, the third identifier in the HE-SIGA carries multiple bits, and the third identifier can not only indicate whether the power of the HE-LTF is increased, but also indicate a value of power increase. For ease of implementation, preferably, the power of the HE-LTF is uniformly increased by 3 dB.

Optionally, in actual implementation, a value of power increase of the HE-LTF field may be bound to a size of an LTF and a transmission bandwidth. For example, when a transmission bandwidth of the HE-LTF and the data part is 52-tone RU, a power of a 2×LTF is increased by 4 dB. For another example, when a transmission bandwidth of the HE-LTF and the data part is 106-tone RU, a power of a 4×LTF is increased by 3 dB.

Optionally, a transmit power of the HE-STF part may be increased separately.

In the foregoing method, the transmit power of the HE-LTF is increased, so that accuracy of channel estimation can be improved. Therefore, a bit error rate of demodulating and decoding the data part is reduced, and the transmission reliability of the data part is improved.

Specifically, the data part in the PPDU in step 810 includes multiple subbands that carry the same data. Specific explanation is as follows: The data part in the EXT PPDU is transmitted in a manner of repeated frequency-domain transmission. For example, if the 106-tone RU is selected, two 106-tone RUs in the bandwidth of 20 MHz carry the same data information, that is, the data information is repeatedly transmitted twice. For another example, if the 52-tone RU is selected, four 52-tone RUs in the bandwidth of 20 MHz in Table 2 carry the same data information, that is, the data information is repeatedly transmitted four times. For a further example, if the 26-tone RU is selected, nine 26-tone RUs in the bandwidth of 20 MHz in Table 2 carry the same data information, that is, the data information is repeatedly transmitted nine times.

Optionally, a high-efficiency signaling HE-SIGA field in the extended range mode PPDU includes a fourth identifier, and the fourth identifier is used to indicate the bandwidth of the subband. Specifically, a mapping relationship between the fourth identifier and the bandwidth of the subband includes the following manners.

Manner 1: The 2-bit fourth identifier is carried in the HE-SIGA field in the preamble in an EXT SU mode. For example, 00 indicates that the data part is repeatedly transmitted nine times by using the 26-tone RU, 01 indicates that the data part is repeatedly transmitted four times by using the 52-tone RU, 10 indicates that the data part is repeatedly transmitted twice by using the 106-tone RU, and 11 indicates that the data part is transmitted by using the 242-tone RU. If it is stipulated that the 242-tone RU is not used as a transmission bandwidth for fields starting from the HE-STF part, 11 is used as a reserved bit.

It should be understood that, when the 26-tone RU is selected, the same data information may be carried on other eight 26-tone RUs than a middle 26-tone RU in the bandwidth of 20 MHz, that is, the data information is repeatedly transmitted eight times.

Manner 2: The 2-bit fourth identifier is carried in the HE-SIGA field in the preamble in an EXT SU mode. For example, when only the 52-tone RU, the 106-tone RU, and the 242-tone RU are used, 00 indicates that the data part is repeatedly transmitted four times by using the 52-tone RU, 01 indicates that the data part is repeatedly transmitted twice by using the 106-tone RU, 10 indicates that the data part is transmitted by using the 242-tone RU, and 11 is used as a reserved bit.

Manner 3: The 1-bit fourth identifier is carried in the HE-SIGA field in the preamble in an EXT SU mode. For example, when only the 52-tone RU and the 106-tone RU are used, 0 indicates that the data part is repeatedly transmitted four times by using the 52-tone RU, and 1 indicates that the data part is repeatedly transmitted twice by using the 106-tone RU.

Manner 4: The 1-bit fourth identifier is carried in the HE-SIGA field in the preamble in an EXT SU mode. For example, when only the 106-tone RU and the 242-tone RU are used, 0 indicates that the data part is repeatedly transmitted twice by using the 106-tone RU, and 1 indicates that the data part is transmitted by using the 242-tone RU.

Optionally, the fourth identifier may further indicate the bandwidth of the subband and a modulation and coding scheme MCS used by the data part. Optionally, in 4-bit indication information included in the fourth identifier, some bits are used to indicate the MCS, and some bits are used to indicate RU allocation. For example, two bits indicate MCS information, and two bits indicate the bandwidth of the subband.

Optionally, the fourth identifier may further indicate the bandwidth of the subband and a quantity of spatial flows used by the data part. For example, in 3-bit information included in the fourth identifier, some bits are used to indicate a quantity of space-time streams, and some bits are used to indicate RU allocation. For example, one bit indicates an NSTS, and two bits indicate the bandwidth of the subband.

This embodiment of the present invention provides the new extended range mode physical layer protocol data unit PPDU. The extended range mode PPDU is transmitted by using the bandwidth of 20 MHz. The data part in the PPDU includes multiple subbands that carry the same data, and the bandwidth of the subband includes at least one of the following parameters: the 26-tone RU, the 52-tone RU, the 106-tone RU, or the 242-tone RU. Repeated transmission in the bandwidth may improve the transmission reliability of the data part, so that the performance of the parts in the PPDU in the EXT SU mode is more balanced, and the converge area of long-distance transmission is ensured.

Embodiment 3

Figure 11:
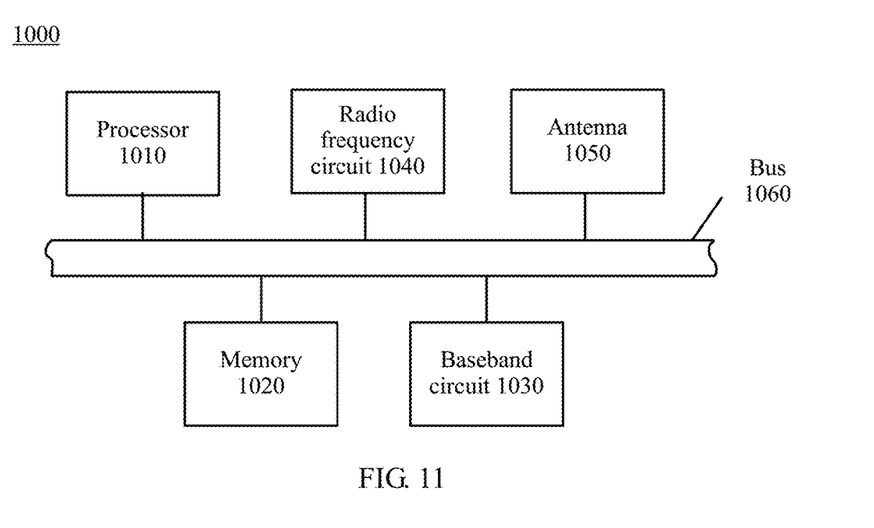
FIG. 11 is a schematic block diagram of an extended range SU mode transmission apparatus in a wireless local area network according to an embodiment of the present invention.

Referring to FIG. 11, FIG. 11 is a schematic block diagram of an extended range SU mode physical layer protocol data unit PPDU transmission apparatus in a wireless local area network according to an embodiment of the present invention. For example, the transmission apparatus is an access point or a station, or a dedicated circuit or chip that implements a related function. The transmission apparatus 1000 includes a processor 1010, a memory 1020, a baseband circuit 1030, a radio frequency circuit 1040, and an antenna 1050. The transmission apparatus may be the AP or the STA shown in FIG. 2.

Specifically, the processor 1010 controls operations of the transmission apparatus 1000. The memory 1020 may include a read only memory and a random access memory, and provide an instruction and data for the processor 1010. The processor may be a general purpose processor, a digital signal processor, an application-specific integrated circuit, a field programmable gate array, or another programmable logical device. A part of the memory 1020 may further include a nonvolatile random access memory (NVRAM). The baseband circuit 1030 is configured to synthesize to-be-transmitted baseband signals, or decode received baseband signals. The radio frequency circuit 1040 is configured to modulate a low-frequency baseband signal to a high-frequency carrier signal, and the high-frequency carrier signal is transmitted by using the antenna 1050. The radio frequency circuit is also configured to demodulate a high-frequency signal received by the antenna 1050 to a low-frequency carrier signal. Components of the transmission apparatus 1000 are coupled together by using a bus 1060. In addition to a data bus, the bus 1060 further includes a power bus, a control bus, and a status signal bus. However, for clear description, various types of buses in the figure are marked as the bus 1060. It should be noted that the foregoing descriptions about a transmission apparatus may be applied to a subsequent embodiment.

The baseband circuit 1030 is configured to generate an extended range mode physical layer protocol data unit PPDU. A legacy preamble part in the extended range mode PPDU is transmitted by using a bandwidth of 20 MHz, a data part in the extended range mode PPDU is transmitted by using a narrowband, and a bandwidth in the narrowband transmission includes at least one of the following parameters: a 26-tone RU, a 52-tone RU, a 106-tone RU, or a 242-tone RU.

The radio frequency circuit 1040 is configured to send the extended range mode PPDU.

In addition, to further improve transmission reliability of the data part in an EXT SU mode, a transmit power of an HE-LTF field in the preamble in an EXT SU mode may be increased. Specifically, the following manners are included.

Manner 1: The power of the high-efficiency long training field HE-LTF in the extended range mode PPDU is increased by 3 dB.

Manner 2: A high-efficiency signaling HE-SIGA field in the extended range mode PPDU includes a first identifier, and the first identifier is used to indicate whether the power of the high-efficiency long training field HE-LTF is increased.

It should be noted that specific designs for the two manners of increasing the transmit power of the HE-LTF field are explained in detail in Embodiment 1. Details are not repeatedly described.

Optionally, a high-efficiency signaling HE-SIGA field in the extended range mode PPDU includes a second identifier, and the second identifier is used to indicate a bandwidth used when the narrowband transmission is performed on the data part in the extended range mode PPDU.

It should be noted that a mapping relationship between the second identifier and the narrowband bandwidth is explained in detail in Embodiment 1. Details are not repeatedly described.

Optionally, subcarriers used by a high-efficiency short training field HE-STF and subcarriers used by the high-efficiency long training field HE-LTF in the extended range mode PPDU are the same as subcarriers used by the data part in the extended range mode PPDU.

Optionally, as shown in FIG. 6, fields in the PPDU that are transmitted by using the narrowband may start from the HE-LTF part, that is, the HE-STF and parts before the HE-STF are all transmitted by using the bandwidth of 20 MHz.

Optionally, as shown in FIG. 7, fields in the PPDU that are transmitted by using the narrowband may start from the EXT-SU-data part, that is, the HE-STF, the HE-LTF, and parts before the HE-STF are all transmitted by using the bandwidth of 20 MHz.

This embodiment of the present invention provides the transmission apparatus, configured to generate and send the new extended range mode physical layer protocol data unit PPDU. The legacy preamble part in the extended range mode PPDU is transmitted by using the bandwidth of 20 MHz. The data part in the extended range mode PPDU is transmitted by using the narrowband, and the bandwidth in the narrowband transmission includes at least one of the following parameters: the 26-tone RU, the 52-tone RU, the 106-tone RU, or the 242-tone RU. In the foregoing method, the data part in the extended range mode PPDU is transmitted by using the narrowband, so that the transmission reliability of the data part is improved, performance of parts in the PPDU in the EXT SU mode is more balanced, and a converge area of long-distance transmission is ensured.

Embodiment 4

Figure 12:
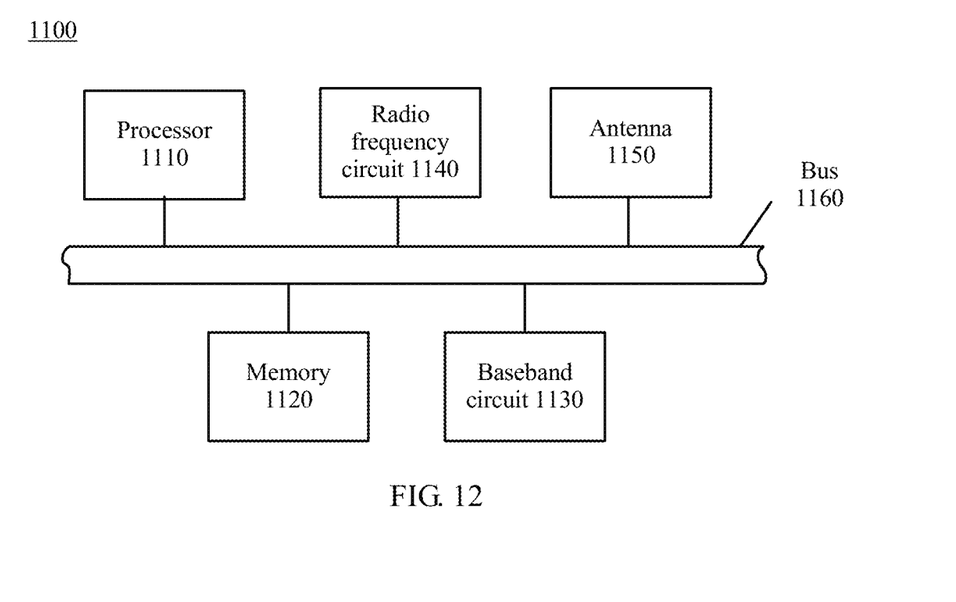
FIG. 12 is a schematic block diagram of an extended range SU mode transmission apparatus in a wireless local area network according to an embodiment of the present invention.

Referring to FIG. 12, FIG. 12 is a schematic block diagram of an extended range mode transmission apparatus in a wireless local area network according to an embodiment of the present invention. For example, the transmission apparatus is an access point or a station, or a dedicated circuit or chip that implements a related function. The transmission apparatus 1100 includes a processor 1110, a memory 1120, a baseband circuit 1130, a radio frequency circuit 1140, and an antenna 1150. The transmission apparatus may be the AP or the STA shown in FIG. 2. It should be noted that components of the transmission apparatus 1100 are explained in detail in Embodiment 3. Details are not repeatedly described.

The baseband circuit 1130 is configured to generate an extended range mode physical layer protocol data unit PPDU. The extended range mode PPDU is transmitted by using a bandwidth of 20 MHz. A data part in the PPDU includes multiple subbands that carry same data, and a bandwidth of the subband includes at least one of the following parameters: a 26-tone RU, a 52-tone RU, a 106-tone RU, or a 242-tone RU.

The radio frequency circuit 1140 is configured to send the extended range mode PPDU.

In the foregoing method, the data part in the PPDU is transmitted repeatedly. This improves transmission reliability of the data part, so that performance of parts in the PPDU in an EXT SU mode is more balanced, and a converge area of long-distance transmission is ensured.

To further improve the transmission reliability of the data part in the EXT SU mode, a transmit power of an HE-LTF field in a preamble in an EXT SU mode may be increased. Specifically, the following manners are included.

Manner 1: The power of the high-efficiency long training field HE-LTF in the extended range mode PPDU is increased by 3 dB.

Manner 2: A high-efficiency signaling HE-SIGA field in the extended range mode PPDU includes a third identifier, and the third identifier is used to indicate whether the power is increased.

It should be noted that specific designs for the two manners of increasing the transmit power of the HE-LTF field are explained in detail in Embodiment 1. Details are not repeatedly described.

Optionally, a high-efficiency signaling HE-SIGA field in the extended range mode PPDU includes a fourth identifier, and the fourth identifier is used to indicate the bandwidth of the subband.

It should be noted that a mapping relationship between the fourth identifier and the bandwidth of the subband is explained in detail in Embodiment 2. Details are not repeatedly described.

Optionally, subcarriers used by a high-efficiency short training field HE-STF and subcarriers used by the high-efficiency long training field HE-LTF in the extended range mode PPDU are the same as subcarriers used by the data part in the extended range mode PPDU. Optionally, an HE-STF field may be transmitted by using the bandwidth of 20 MHz, and only subcarriers used by the HE-LTF part are the same as subcarriers used by the data part in the extended range mode PPDU. Optionally, as shown in FIG. 10, an HE-STF and the HE-LTF may be transmitted by using the bandwidth of 20 MHz, and repeated subband transmission is performed only on the EXT-SU-DATA part.

This embodiment of the present invention provides the transmission apparatus, configured to generate and send the new extended range SU mode physical layer protocol data unit PPDU. The extended range mode PPDU is transmitted by using the bandwidth of 20 MHz. The data part in the PPDU includes multiple subbands that carry the same data, and the bandwidth of the subband includes at least one of the following parameters: the 26-tone RU, the 52-tone RU, the 106-tone RU, or the 242-tone RU. Repeated transmission in the bandwidth may improve the transmission reliability of the data part, so that the performance of the parts in the PPDU in the EXT SU mode is more balanced, and the converge area of long-distance transmission is ensured.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for transmitting an extended range single user (SU) mode physical layer protocol data unit (PPDU) in a wireless local area network WLAN, comprising:
   generating, an extended range single user (SU) mode physical layer protocol data unit (PPDU), a High-Efficiency Signaling A (HE-SIGA) field of the extended range SU mode PPDU includes an identifier, the identifier is used to indicate a bandwidth of a narrowband used for transmitting fields starting from a High-Efficiency Short Training Field (HE-STF) of the extended range SU mode PPDU, the bandwidth of the narrowband comprises at least one of the following parameters: a 26-tone Resource Unit (RU), a 52-tone RU, a 106-tone RU, or a 242-tone RU; wherein the identifier includes 2 bits, a value 1 of the 2 bits indicates that the 106-tone RU is allocated as the narrowband for the fields starting from the HE-STF, a value of 0 indicates that the 242-tone RU is allocated as the narrowband for the fields starting from the HE-STF; and
   transmitting, the extended range SU mode PPDU, the fields starting from the HE-STF of the extended range SU mode PPDU are transmitted by using the bandwidth of the narrowband.

2. The method according to claim 1, wherein the extended range SU mode PPDU further comprises a legacy preamble part and a high-efficiency preamble (HE Preamble) part, the HE Preamble part is located between the legacy preamble part and a data part;
   wherein the HE Preamble part comprises a repeated legacy signaling field (RL-SIG field), the HE-SIGA field, the HE-STF and a high-efficiency long training field (HE-LTF);
   wherein the legacy preamble part, the RL-SIG field and the HE-SIGA field are transmitted by using the bandwidth of 20 MHz;
   wherein the fields starting from the HE-STF comprises the HE-STF, the HE-LTF and the data part.

3. The method according to claim 2, wherein a transmit power of the HE-STF is increased.

4. An extended range single user (SU) mode physical layer protocol data unit PPDU transmission apparatus, applied to a wireless local area network (WLAN), comprising:
   a baseband circuit, configured to generate an extended range single user (SU) mode physical layer protocol data unit (PPDU), a High-Efficiency Signaling A (HE-SIGA) field of the extended range SU mode PPDU includes an identifier, the identifier is used to indicate a bandwidth of a narrowband used for transmitting fields starting from a High-Efficiency Short Training Field (HE-STF) of the extended range SU mode PPDU, the bandwidth of the narrowband comprises at least one of the following parameters: a 26-tone Resource Unit (RU), a 52-tone RU, a 106-tone RU, or a 242-tone RU; wherein the identifier includes 2 bits, a value 1 of the 2 bits indicates that the 106-tone RU is allocated as the narrowband for the fields starting from the HE-STF, a value of 0 indicates that the 242-tone RU is allocated as the narrowband for the fields starting from the HE-STF; and
   a radio frequency circuit, configured to transmit the extended range SU mode PPDU, the fields starting from the HE-STF of the extended range SU mode PPDU are transmitted by using the bandwidth of the narrowband.

5. The apparatus according to claim 4, wherein the extended range SU mode PPDU further comprises a legacy preamble part and a high-efficiency preamble (HE Preamble) part, the HE Preamble part is located between the legacy preamble part and a data part;

wherein the HE Preamble part comprises a repeated legacy signaling field (RL-SIG field), the HE-SIGA field, the HE-STF, and a high-efficiency long training field (HE-LTF);

wherein the legacy preamble part, the RL-SIG field and the HE-SIGA field are transmitted by using the bandwidth of 20 MHz;

wherein the fields starting from the HE-STF comprises the HE-STF, the HE-LTF and the data part.

6. The apparatus according to claim 5, wherein a transmit power of the HE-STF is increased.

7. A non-transitory computer-readable recording medium storing computer instructions, that when executed by one or more processors, cause the one or more processors to perform the steps of:

generating, an extended range single user (SU) mode physical layer protocol data unit (PPDU), a High-Efficiency Signaling A (HE-SIGA) field of the extended range SU mode PPDU includes an identifier, the identifier is used to indicate a bandwidth of a narrowband used for transmitting fields starting from a High-Efficiency Short Training Field (HE-STF) of the extended range SU mode PPDU, the bandwidth of the narrowband comprises at least one of the following parameters: a 26-tone Resource Unit (RU), a 52-tone RU, a 106-tone RU, or a 242-tone RU; wherein the identifier includes 2 bits, a value 1 of the 2 bits indicates that the 106-tone RU is allocated as the narrowband for the fields starting from the HE-STF, a value of 0 indicates that the 242-tone RU is allocated as the narrowband for the fields starting from the HE-STF; and transmitting, the extended range SU mode PPDU, the fields starting from the HE-STF of the extended range SU mode PPDU are transmitted by using the bandwidth of the narrowband.

8. The non-transitory computer-readable recording medium according to claim 7, wherein the extended range SU mode PPDU further comprises a legacy preamble part and a high-efficiency preamble (HE Preamble) part, the HE Preamble part is located between the legacy preamble part and a data part;

wherein the HE Preamble part comprises a repeated legacy signaling field (RL-SIG field), the HE-SIGA field, the HE-STF and a high-efficiency long training field (HE-LTF);

wherein the legacy preamble part, the RL-SIG field and the HE-SIGA field are transmitted by using the bandwidth of 20 MHz;

wherein the fields starting from the HE-STF comprises the HE-STF, the HE-LTF and the data part.

* * * * *